United States Patent
Caruk et al.

(10) Patent No.: US 7,096,303 B1
(45) Date of Patent: Aug. 22, 2006

(54) METHOD AND APPARATUS FOR CONFIGURING AN INTEGRATED BUS

(75) Inventors: Gordon Caruk, Bramalea (CA); Kuldip Sahdra, Richmond Hill (CA); Arkadi Avrukin, Pleasanton, CA (US); Michael Frank, Sunnyvale, CA (US); Jamil Ahmed, Stroud (CA); James B. Fry, Newmarket (CA); Sasa Marinkovic, Toronto (CA)

(73) Assignee: ATI International SRL, Christchurch (BB)

( * ) Notice: Subject to any disclaimer, the term of this patent is extended or adjusted under 35 U.S.C. 154(b) by 351 days.

(21) Appl. No.: 09/586,868

(22) Filed: Jun. 5, 2000

(51) Int. Cl.
 *G06F 13/36* (2006.01)
(52) U.S. Cl. .................... 710/306; 710/310; 710/316
(58) Field of Classification Search ........... 710/100, 710/107, 305, 112, 300, 306, 113, 310, 316; 345/503, 520, 522; 709/1; 326/30, 62; 340/825–825.98; 327/206; 348/14.09; 711/151; 712/312
 See application file for complete search history.

(56) References Cited

U.S. PATENT DOCUMENTS

| | | | | |
|---|---|---|---|---|
| 4,529,840 A * | 7/1985 | Colton et al. | ............ | 348/14.09 |
| 4,843,542 A * | 6/1989 | Dashiell et al. | ............ | 711/119 |
| 5,321,806 A * | 6/1994 | Meinerth et al. | ........... | 345/522 |
| 5,517,650 A * | 5/1996 | Bland et al. | ................ | 713/323 |
| 5,621,900 A * | 4/1997 | Lane et al. | ................ | 710/120 |
| 5,633,599 A * | 5/1997 | Kubota | ........................ | 326/16 |
| 5,701,306 A * | 12/1997 | Arai | ............................ | 714/724 |
| 5,850,530 A * | 12/1998 | Chen et al. | ................. | 710/113 |
| 5,889,970 A * | 3/1999 | Horan et al. | ................ | 712/312 |
| 5,892,964 A * | 4/1999 | Horan et al. | ................ | 712/33 |
| 6,005,412 A * | 12/1999 | Ranjan et al. | ............... | 326/63 |
| 6,040,845 A * | 3/2000 | Melo et al. | ................ | 345/520 |
| 6,133,772 A * | 10/2000 | Drapkin et al. | ............ | 327/206 |
| 6,141,021 A * | 10/2000 | Bickford et al. | ........... | 345/503 |
| 6,256,744 B1 * | 7/2001 | Simonich et al. | .......... | 713/340 |
| 6,275,240 B1 * | 8/2001 | Riffault | ..................... | 345/520 |
| 6,286,083 B1 * | 9/2001 | Chin et al. | .................. | 711/151 |
| 6,292,859 B1 * | 9/2001 | Santiago | .................... | 710/107 |
| 6,496,894 B1 * | 12/2002 | Fanning | ..................... | 710/305 |
| 6,606,098 B1 * | 8/2003 | Wheeler et al. | ........... | 345/520 |
| 6,624,817 B1 * | 9/2003 | Langendorf | ................ | 345/520 |
| 6,832,269 B1 * | 12/2004 | Huang et al. | ................ | 710/11 |
| 2001/0028353 A1 * | 10/2001 | Cheng | ....................... | 345/531 |

OTHER PUBLICATIONS

Morris Mano, "Computer System Architecture", 1982, Prentice-Hall, Inc., 2nd ed., pp. 53-54.*

* cited by examiner

*Primary Examiner*—John R. Cottingham
*Assistant Examiner*—Justin King
(74) *Attorney, Agent, or Firm*—Vedder, Price, Kaufman & Kammholz, P.C.

(57) ABSTRACT

A configurable bus interface circuit includes an internal bus bridge and an internal circuit. The configurable bus interface circuit also includes an internal I/O circuit couplable to an external circuit, via the internal bus bridge. The configurable bus interface circuit electrically isolates the internal circuit to avoid the propagation of signals between the internal I/O circuit and the external circuit.

21 Claims, 4 Drawing Sheets

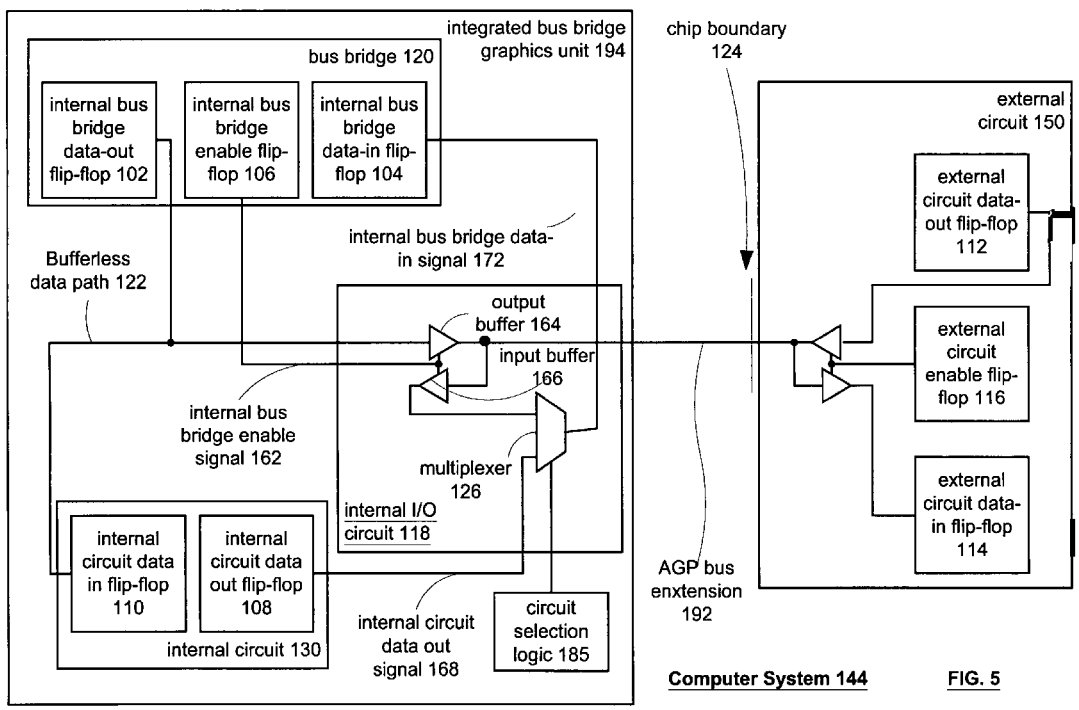
Computer System 144    FIG. 5

US 7,096,303 B1

METHOD AND APPARATUS FOR CONFIGURING AN INTEGRATED BUS

FIELD OF THE INVENTION

The invention relates generally to computer systems and more particularly to integration of bus bridges, graphics devices, or other devices.

BACKGROUND OF THE INVENTION

As improved fabrication techniques allow greater and greater circuit density within electronic devices, functionality previously distributed over several chips migrated onto a single chip. Microprocessors, for example, now perform functions previously found on co-processors and peripheral controllers in addition to the more traditional processing role. However, migrating several functions onto a single chip hinders an end user's ability to upgrade peripheral functions that have migrated onto the processor. For example, if a graphics controller or other peripheral controller is implemented integrally with a processor, the end user may have difficulty upgrading the graphics controller without having to purchase a new microprocessor or computer system.

The migration of functionality onto a single chip therefore can lock the end user into a single configuration. When a chip set implements peripheral controllers on the same chip as the processors, it can be difficult for an end user to disable on-chip peripheral controllers to upgrade as new peripheral controllers become available. One of the new chip sets includes an integrated bus bridge and graphics controller. Migrating the bus bridge and graphics controller onto a single chip allows much more efficient reuse as well as the elimination of redundant circuitry, as well as reducing cost. The internal graphics controller can quickly access main memory via the on-chip bus bridge. However, the new chip set does not forego expandability. As new graphics controllers become available, the end user can insert expansion cards containing upgrade graphics controllers into expansion slots within the computer system. A graphics controller implemented on an expansion card is coupled to the bus bridge via a bus, typically either an accelerated graphics port (AGP) bus or peripheral component interconnect (PCI) bus. Both of these bus types are source terminated, in that they rely on a reflected wave to be absorbed by the output impedance of the signal driver. The output impedance of the driver equals the line impedance.

However, the presence of an expansion slot coupled to the expansion bus presents problems for the on-chip graphics controller when no expansion graphics controller is inserted into the expansion slot. For example, when the bus bridge provides a signal for the on-chip graphics controller, echoes or signal reflections from the expansion slot can interfere with the on-chip graphics controller's reception of the signal. Because the bus bridge and on-chip graphics controller are implemented on the same chip, signals propagate from the bus bridge to the on-chip graphics controller, by going all the way down the bus to the expansion slot and then are reflected back before the on chip graphics controller sees the full magnitude of the signal. The elapsed time is twice as long as the signal takes to get to the graphics controller in the expansion slot. Since the bus specifications are defined to the device farthest away from the bus bridge, either the bus has to be half the length defined by the specification, or the bus has to be non-compliant with the specifications.

In many respects, the expansion bus terminating in the empty expansion slot operates as a transmission line. Source terminated busses operate with the impedance of the output buffer, approximately equal to the ended transmission line impedance. The bus bridge applies a voltage to the expansion bus, implementing a signal that propagates down the expansion bus and is then reflected back towards the bus bridge. Because the impedance at the expansion slot is infinite, the reflection coefficient is one. Therefore, the reflected signal reinforces the propagating signal and produces a voltage double the applied voltage. The on-chip graphics controller, therefore, receives a first voltage directly from the on-chip bus bridge, and later receives a reflection signal to bring it up to the full magnitude. Operating at high speeds, the interface between the bus bridge and the on-chip graphics controller suffers excessive delay caused by driving the signal out to the expansion slot and back again to get to the on-chip graphics controller.

Therefore, a need has arisen for a configurable bus interface coupling an internal bus bridge, an internal circuit such as an on-chip graphics controller and an external circuit such as an expansion slot configured to receive an expansion or upgrade graphics controller.

BRIEF DESCRIPTION OF THE DRAWINGS

FIG. 5 shows a computer system including a configurable bus interface circuit according to an exemplary embodiment of the present invention.

DETAILED DESCRIPTION OF A PREFERRED EMBODIMENT OF THE INVENTION

The present invention includes a configurable bus interface circuit that includes an internal bus bridge and an internal circuit such as an internal (i.e., on-chip) graphics controller. The configurable bus interface circuit also includes an internal I/O circuit such as a buffer coupled between the bus bridge and the external circuit, operably coupled to prevent any signals from the external circuit from reaching the internal circuit. Accordingly, no signals reflected from an empty expansion slot (i.e., transmission line effects) can reach an on-chip graphics controller.

Figure 1:
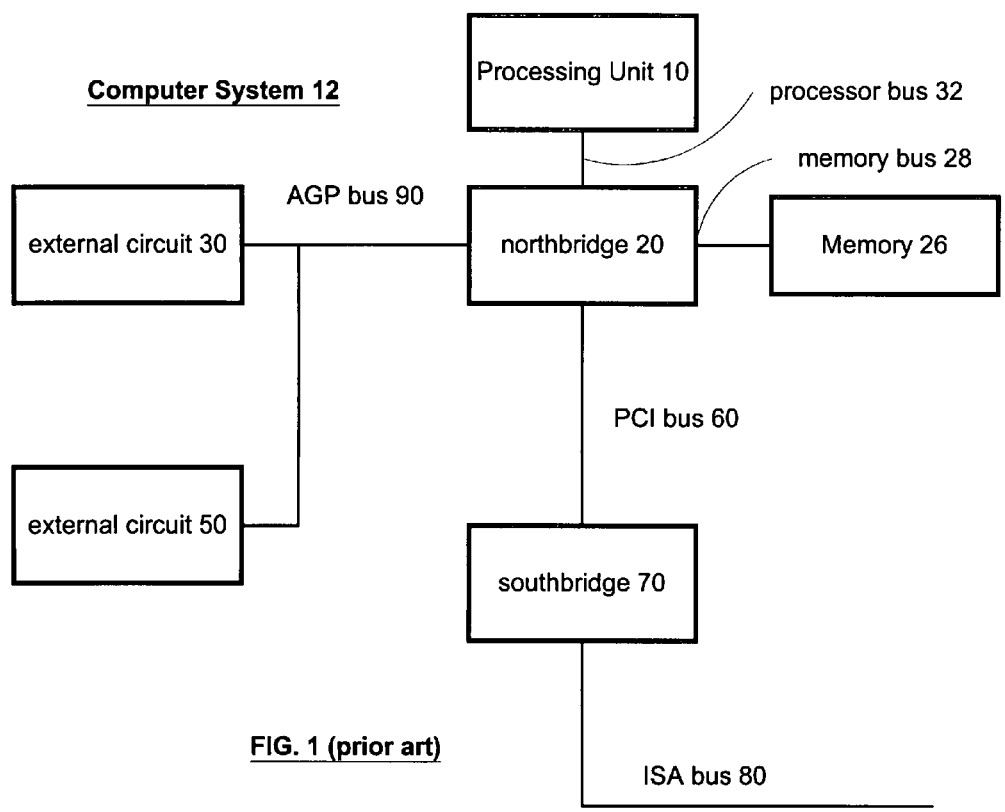
FIG. 1 illustrates a conventional computer system 12 with a processing unit 10, coupled to a northbridge 20.

FIG. 1 shows a conventional computer system 12 with a processing unit 10, coupled to a northbridge 20. The northbridge 20 is a well-known bus bridge configured to couple a memory bus 28, a processor bus 32, and an expansion or system bus such as a PCI bus 60. The memory bus 28 couples the northbridge 20 to a memory 26. The processor bus 32 couples the northbridge 20 to the processing unit 10. The PCI bus 60 couples the northbridge 20 to other devices within the computer system 12.

The northbridge 20 shown in FIG. 1 is also coupled to an accelerated graphics port bus, referred to as AGP bus 90. The AGP bus 90 is coupled to both an external circuit 30 and an external circuit 50. Accordingly, both the external circuit 30 and the external circuit 50 receive signals from the northbridge 20 over the AGP bus 90. A southbridge 70 couples the PCI bus 60 to an additional bus 80.

It will be understood that AGP is offered as an example of a bus protocol, and that other bus protocols may be used without departing from the present invention. For example, an NGP bus protocol or a PCI bus protocol may be used instead of, or in conjunction with, an AGP bus. It will also be understood that the term "coupled" refers to components that are coupled indirectly as well as to components that are coupled directly.

The external circuit 30 is a graphics controller that is further coupled to a first graphics monitor (not shown). The external circuit 30 may access the memory 26 or other devices coupled to the PCI bus 60, and displays data on the first graphics monitor. The external circuit 50 is also a graphics controller that may be coupled to a second graphics monitor (not shown). However, the external circuit 50 may be removed from the computer system 12.

The northbridge 20 issues graphics data over the AGP bus 90. The AGP bus 90 couples both the external circuit 30 and the external circuit 50 (residing within an expansion slot, not shown) to the northbridge 20. The portion of the AGP bus 90 that couples the external circuit 50 to the northbridge 20 is the full length allowed by the specification. The external circuit 30 is close to the same end of the AGP bus 90 as the northbridge 20, so the propagation delay between the external circuit 30 and the northbridge 20 is relatively short. However, the AGP bus 90 also returns a reflection signal from the external circuit 50 to the external circuit 30. The round-trip propagation delay between the northbridge 20 and the external circuit 30 is approximately twice as long as the trip to the external circuit 50 (i.e., the full length allowed by the specification). This propagation delay postpones a time at which the signal at the internal circuit 30 reaches full magnitude.

Figure 2:
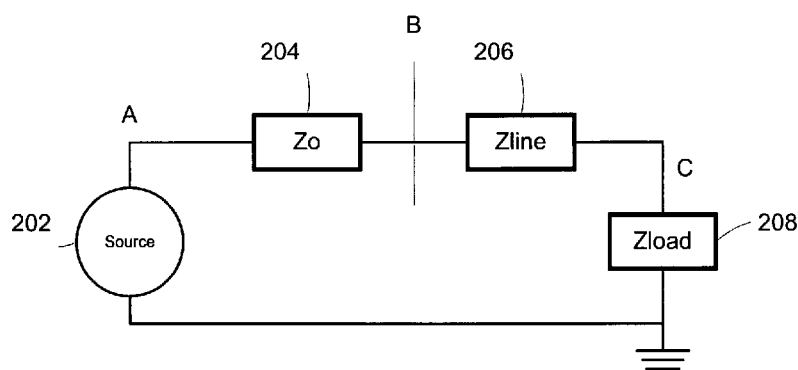
FIG. 2 shows the additional impedance of the AGP bus extending to the external circuit 50, according to the circuit shown in FIG. 1.

FIG. 2 shows the additional impedance of the AGP bus 90 extending to the external circuit 50, according to the circuit shown in FIG. 1. The path of the wavefront is a source-terminated transmission line. FIG. 2 includes a source 202 that is a unit step voltage source, an output impedance Zo, and a line impedance Zline. The source 202, located at an output of the bus bridge 20, applies a voltage to a point A which is propagated along the AGP bus 90. The AGP bus 90 operates as a transmission line between points A and C, and carries the voltage to the external circuit 30 and the external circuit 50. Zo 204 is the real impedance of the output drive on the chip.

Zline 206 represents a characteristic alternating current (AC) impedance of the AGP bus 90. Zload 208 represents an impedance of the external circuit 50. Zload 208 is effectively an infinite impedance when the external circuit 50 is removed, and also when the external circuit 50 is installed since the input impedance of the external circuit 50 is so large. The voltage at the source 202 is the initial voltage step. This step is theoretical in that it does not take into account the inpact that output impedance has on the initial wave present that is launched down the transmission line. This voltage, in an AGP 4× bus implementation, is a unit step of 1.5 volts. Because Zo 204 is equal to Zline 206, the transmission path between the source and the load is effectively a voltage divider. Point "B" is the point where the output buffer connects to the transmission line. It is also the input to the internal graphics controller (not shown). The voltage at point "B" is (Vsource)*(Zline)/(Zo+Zline). At point B, the initial signal launched down the transmission line has a voltage of 0.75 volts. A receiver at the input to the internal graphics controller normally cannot determine the value of the signal until the voltage on the transmission line rises to approximate the full value of the source unit step.

In many respects, the expansion bus terminating in the empty expansion slot operates as a transmission line. The bus bridge applies a voltage to the expansion bus, implementing a signal that propagates down the expansion bus and is then reflected back towards the bus bridge. Because the impedance at the far end of the transmission line is essentially infinite, the reflected signal reinforces the propagating signal and produces a voltage approximately double the applied voltage.

The signal propagates along the AGP bus 90 until reaching Zload 208, which reflects the signal. Zload 208 is typically an open circuit, having infinite impedance. There is a reflection coefficient of (Zload-Zline)/(Zo*Zline). When this is matched, the reflection coefficient is zero, and there is no reflection. When this is open, the reflection coefficient is one. At point "C," the voltage doubles upon the arrival of the signal, due to the reflection. The signal is reflected back, doubling the voltage on the transmission line as it propagates. When the reflection reaches the source 202, Zo 204 absorbs the reflection. Since Zo=Zline, Zo−Zline=0. This makes the reflection coefficient 0, so no subsequent reflection will occur. Eventually, the reflection reaches point B, and is added to the original signal, doubling the signal.

A receiver at point B does not see the full 1.5 volts immediately. Specifications normally consider only the propagation time from the source to the load. The propagation time from the source to the load and then returning to point B is a delay that can, unfortunately, exceed the specifications. The receiver at point B actually sees the voltage later than does the receiver at point "C."

The external circuit 50 is shown as an effective impedance Zload 208. The bus driver operational protocol can be represented as a voltage source and an impedance Zo 204. The effective impedance of the AGP bus 90, as seen by the northbridge 20, is represented as Zline 206. The impedance, Zload (approximately infinite) does not match the loaded transmission line impedance, Zline 206. Therefore, the mismatched impedance creates a reflection from the expansion slot that propagates back through the AGP bus 90 to the external circuit 30.

Figure 3:
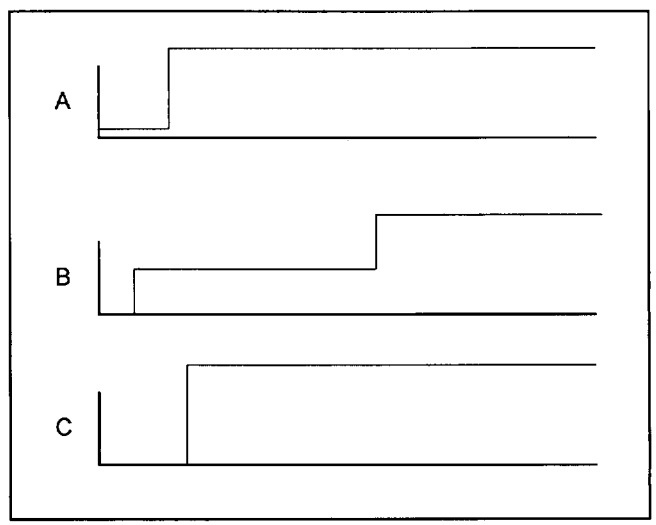
FIG. 3 shows the voltage of the AGP bus at three different points along the AGP bus of FIG. 1.

FIG. 3 shows the voltage of the AGP bus at three different points along the AGP bus of FIG. 1. It should be understood that the source 202 and the Zo 204 represent an output buffer that drives the AGP bus signal. Trace A of FIG. 3 shows the voltage at the output of the voltage source portion that is implementing the bus driver operational protocol. This is a theoretical waveform that does not take into account the impact that the output impedance (Zo 204) has on the initial wavefront. In trace A, a relatively abrupt increase in voltage implements the application of a signal. The voltage rises relatively abruptly, from zero volts to 1.5 volts.

Trace C represents the voltage detected at the load. Trace B shows the signal at the output of the chip at point B. In trace B, the applied signal is almost immediately detected. However, it is only at half-magnitude due to the Zo/Zline voltage divider. Any delay between the rise in trace A and the first rise in trace B is due to propagation delay in the bridge's output. Trace C shows the voltage of the AGP bus 90 observed at a point adjacent to the external circuit 50. As can be seen upon examination of trace C, a rise in voltage is delayed with respect to the corresponding rise in voltage of trace A and trace B. The relative delay between the rise of trace B and the rise of trace C is due to the propagation delay along the length of the AGP bus 90, from the northbridge 20 to the external circuit 50.

Returning to trace B, a second rise in the voltage of the AGP bus 90 as observed at the external circuit 30 is due to a reflection of the rise in trace C. The second increase in the voltage shown in trace B brings the signal at the external circuit 30 to full magnitude.

Figure 4:
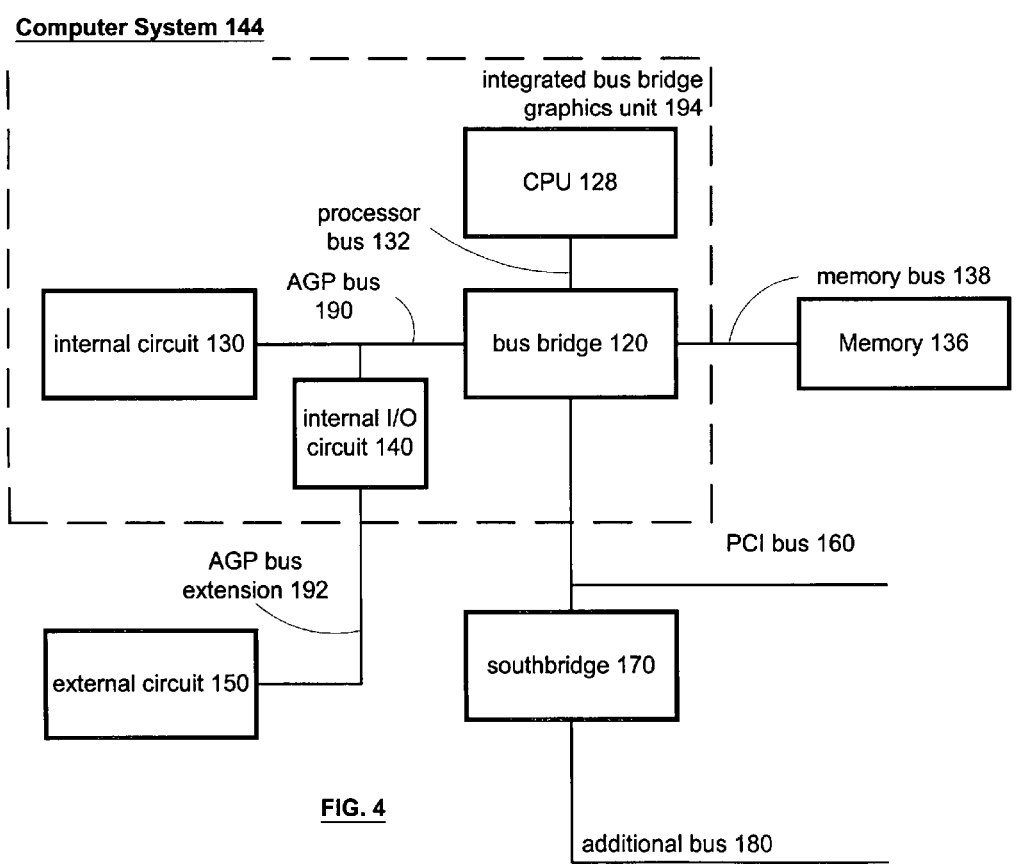
FIG. 4 shows a computer system 144 according to one embodiment of the present invention.

FIG. 4 shows a computer system 144 according to one embodiment of the present invention. The computer system 144 includes a bus bridge graphics unit, for example an integrated bus bridge graphics unit 194, belonging to a chip set of the computer system 144. The integrated bus bridge graphics unit 194 includes a second internal circuit, for example a bus bridge 120 having a bus interface to a processor bus. The bus bridge 120 may be replaced with any internal circuit. A processor bus 132 couples the bus bridge 120 to an optionally-integrated CPU 128. A memory bus 138 couples the bus bridge 120 to a memory 136. An accelerated graphics port bus 190 couples the bus bridge 120 to a first internal circuit (represented as an internal circuit 130), for example a graphics controller having an interface to a video monitor (not shown). The internal circuit 130 may be coupled to a first graphics monitor (not shown). The bus bridge 120 may be a northbridge, similar to the northbridge 20 of FIG. 1, or may be any other device suitable for passing signals between the CPU 128 and the internal circuit 130. The bus bridge graphics unit 194 optionally integrates any or all of the formentioned circuits and components.

The accelerated graphics port bus 190 is shown for illustrative purposes. Although an actual bus may be optionally included, the bus bridge 120 may be connected directly to the internal circuit 130 without any bidirectional or multiple driver nets. The accelerated graphics port bus 190 is shown to illustrate signals passing between the bus bridge 120 and the internal circuit 130. There need not be any preservation of the bus protocols; and, need not be restricted to AGP or to PCI. The PCI bus protocol is presented as an example. Any connection protocol serves to provide connection.

The integrated bus bridge graphics unit 194 also includes an internal I/O circuit 140, coupled to an external circuit 150 by a first external signal path, for example an AGP bus extension 192. The external circuit 150 may be coupled to a second graphics monitor (not shown). The internal I/O circuit 140 is merely an example, and may be replaced with any suitable circuit, such as a device unidirectionally coupled between the AGP bus 190 and the AGP bus extension 192. "Unidirectional" in this sense does not refer to the bus itself, which is a well-known AGP bus; instead, unidirectional refers to the ability to intercept and eliminate a flow of data or signals in one direction while permitting the flow of data or signals in the other direction. The internal I/O circuit 140 is, for example, a buffer capable of allowing data to flow in only one direction.

Also shown in FIG. 4, the external circuit 150 is coupled to the integrated bus bridge graphics unit 194 via the internal I/O circuit 140. In some embodiments, the external circuit 150 may represent nothing more than an empty expansion slot operably coupled to receive an upgrade graphics controller. If desired, a user or an original equipment manufacturer (OEM) may include an upgrade graphics controller within the expansion slot, representing another embodiment of the external circuit 150. The external circuit 150 allows a user or a manufacturer to add expansion devices to the computer system. Expansion devices include upgrade graphics cards. In other embodiments, network interface cards, memory devices, or parallel processors may be added by inserting appropriate expansion cards into the expansion slot of the external circuit 150.

Transmission line reflections are found in other situations as well. For example, whenever a board or circuit is expandable by the insertion of an expansion device, the absence of the expansion device causes reflection from the open-ended bus, wire, or trace. The reflection can interfere with signals propagating on the board or circuit among existing devices. Suppressing reflections from the open-ended bus, wire, or trace when the expansion device is absent improves the ability of the existing devices to communicate.

When the external circuit 150 is merely a vacant expansion slot, circuit selection logic 185 (shown in FIG. 5) disables the propagation of signals from the external circuit 150 to the internal circuit 130. In other words, when the external circuit 150 is nothing more than a vacant expansion slot, the circuit selection logic 185 electrically isolates the external circuit 150 (and the portion of the AGP bus 190 extending from the internal I/O circuit 140 to the external circuit 150) from the internal circuit 130 (and the portion of the AGP bus 190 extending from the bus bridge 120 to the internal circuit 130). On the other hand, when the external circuit 150 is, or is coupled to, a graphics controller, a circuit selection logic 185 (shown in FIG. 5) disables the internal circuit 130 and allows signals to propagate between the external circuit 150 and the bus bridge 120.

In one embodiment, the bus bridge 120, the internal circuit 130, the AGP bus 190, and the internal I/O circuit 140, and optionally a CPU 128 are all implemented on a single chip identified as the integrated bus bridge graphics unit 194. Therefore, signals propagate among the various devices on the integrated bus bridge graphics unit 194 at high speeds, having little or no bus length that could result in propagation delays.

A southbridge 170 couples a PCI bus 160 to an ISA bus 180. The southbridge 170 is a well-known secondary bus bridge, often found in computer systems between buses other than the processor bus, and may be replaced with any other device commonly found on a bus that is coupled to the bus bridge 120.

Operationally, signals from the bus bridge 120 propagate along the AGP bus 190 to both the internal circuit 130 and the external circuit 150. The internal I/O circuit 140 captures signals, when the signals are valid, from the external circuit 150. The internal circuit 130 is coupled to the bus bridge 120 bufferlessly (i.e., without any intervening I/O buffer). Buffer, in this context, refers to an I/O buffer at an edge of a chip.

The bus bridge 120 is therefore operably coupled to write to both the internal circuit 130 and the external circuit 150 in parallel. In other embodiments, the bus bridge 120 is operably coupled to select and to write to either the internal circuit 130 or the external circuit 150. The circuit selection logic 185 (shown in FIG. 5) is operative to detect the presence or absence of a graphics controller at the external circuit 150, and to select either the internal circuit 130 or the external circuit 150 accordingly. In still other embodiments, the circuit selection logic 185 is operably configured to receive a signal from the CPU 128, and to detect the intended destination of any bus bridge signals propagating from the bus bridge 120 onto the AGP bus 190.

When the circuit selection logic 185 determines that the bus bridge 120 is directing signals to the internal circuit 130, or when the circuit selection logic 185 detects the absence of any graphics controller at the external circuit 150, the circuit selection logic 185 configures itself to obstruct the propagation of any signals from the external circuit 150 to any on-chip device. In some embodiments, the AGP bus extension 192 is a unidirectional bus that obstructs the propagation of any signals from the external circuit 150 to any on-chip device. In other embodiments, the AGP bus extension 192 is bidirectional, and the internal I/O circuit 140 includes an input buffer that provides signals to the bus bridge 120 but not to the internal circuit 130.

Alternatively, if the circuit selection logic 185 detects the presence of a graphics controller at the external circuit 150 or detects that any bus bridge signals from the bus bridge 120 onto the AGP bus 190 are intended for the external circuit 150, then the circuit selection logic 185 configures itself to permit the propagation of signals from the external circuit 150 to the AGP bus 190. When the circuit selection logic 185 allows the propagation of signals from the external circuit 150 to the AGP bus 190, the circuit selection logic 185 disables the graphics controller (not shown) located at the internal circuit 130. The disabling of the internal circuit 130 does not preclude the graphics controller at the internal circuit 130 to receive signals from the AGP bus 190.

FIG. 5 shows a computer system 144 including a configurable bus interface circuit according to an exemplary embodiment of the present invention. In the embodiment of FIG. 5, the configurable bus interface circuit is an integrated bus bridge graphics unit 194. The integrated bus bridge graphics unit 194 in one embodiment includes the CPU 128. In another embodiment, the CPU 128 is implemented on a separate chip. The computer system 144 of FIG. 5 includes a bus (north) bridge 120, an internal circuit 130, and an external circuit 150. The bus bridge 120 and the internal circuit 130 reside on the integrated bus bridge graphics unit 194. The external circuit 150 resides off the integrated bus bridge graphics unit 194, and is separated from the integrated bus bridge graphics unit 194 by a chip boundary 124.

Referring again to FIG. 4, the CPU 128 controls the bus bridge 120. The bus bridge 120 is operably coupled to transfer signals among the processor bus 132, the AGP bus 190, the memory bus 138, and the PCI bus 160. When the CPU 128 writes data to the memory 136, the bus bridge 120 provides the data to the memory 136 via the memory bus 136. When the CPU 128 writes data to other devices within the computer system 144, the bus bridge 120 provides the data to the PCI bus 160. The southbridge 170 passes signals from the PCI bus 160 to the ISA bus 180. The southbridge 170 is a well-known secondary bus bridge, often found in computer systems between buses other than the processor bus, and may be replaced with any other device.

When the CPU 128 writes data to internal circuit 130 or the external circuit 150, the bus bridge 120 provides the data to the appropriate circuit via AGP bus 190. When the CPU 128 writes data to the external circuit 150, internal I/O circuit 140 provides the data from the AGP bus 190 to the external circuit 150 via the AGP bus extension 192.

Referring again to FIG. 5, the bus bridge 120 includes an internal bus bridge data-out flip-flop 102, an internal bus bridge data-in flip-flop 104, and an internal bus bridge enable flip-flop 106. The various flip-flops are, for example, D-type flip-flops, toggle-type flip-flops, JK flip-flops, SR flip-flops, clock enabled D-type flip-flops, or any other type of flip-flop. The flip-flops serve to align data with the interface clock to comply with timing requirements of the AGP bus protocol.

The internal bus bridge enable flip-flop 106 provides an internal bus bridge enable signal 162 to the internal I/O circuit 140 that allows the bus bridge 120 to issue a second internal signal via a second internal signal path (a first portion of the bufferless data path 122) and an output buffer 164 over the AGP bus extension 192. The internal bus bridge data-out flip-flop 102 aligns the data to comply with the AGP bus protocol, if necessary, within the bus bridge 120 pending issue of the data over the AGP bus 190 (shown in FIG. 4). The signal at the data input of the output buffer 164 is shown connected to the data input of the internal circuit data in flip flop 110, and is driven from the internal bus bridge data out flip flop 102. Any arrangement that affords the bus bridge 120 being able to send a signal to the input of the output buffer 164, and a logically similar signal to the input of the internal circuit data in flip flop 110, applies.

The bus bridge 120 receives data via an internal bus bridge data-in signal 172. When the bus bridge 120 receives data, the bus bridge 120 captures the data in the internal bus bridge data-in flip-flop 104. The internal bus bridge data-in flip-flop 104 of the bus bridge 120 receives a selected signal from a selector circuit, for example multiplexer 126, via a third internal signal path. The multiplexer 126 selects whether the internal bus bridge data-in flip-flop 104 receives a signal from the external circuit 150 or from the internal circuit 130 and provides the selected signal to the internal bus bridge data-in flip-flop 104.

In one embodiment, a "strap," i.e. a pin that is set to a predetermined value as part of an initialization process, configures multiplexer 126. Internal logic captures this value. This value is then used to configure the internal circuitry to operate in a desired mode. A control bit of a register within the integrated bus bridge graphics unit 194, or within circuitry that monitors transfers from the bus bridge 120 to the internal circuit 130 and the external circuit 150, or which is set by a mechanical switch, or by an initialization circuit configuration, determines whether the multiplexer 126 selects the external circuit 150 or the internal circuit 130. When the multiplexer 126 selects the external circuit 150, the multiplexer 126 receives a first external signal, for example signal or signals from the AGP bus extension 192, via an input buffer 166. When the multiplexer 126 selects the internal circuit 130, the multiplexer 126 receives a first internal signal or signals, for example an internal circuit data out signal 168, from the internal circuit data out flip-flop 108 of the internal circuit 130 over a first internal signal path.

Because the input buffer 166 does not provide a path from the external circuit 150 to the internal circuit 130, the internal circuit 130 is not affected by any transmission line effects. Signals from the bus bridge 120 over the bufferless data path 122 to the internal circuit 130 are not corrupted by any signals from the external circuit 150. In particular, signals from the bus bridge 120 over the bufferless data path 122 to the internal circuit 130 are not corrupted by any reflection signals that are reflected from the external circuit 150 and that represent a delayed version of the second signal.

The internal circuit 130 includes an internal circuit data-in flip-flop 110 and the internal circuit data-out flip-flop 108. When the internal circuit 130 is configured to receive data, the data is captured in the internal circuit data-in flip-flop 110. When the internal circuit 130 is configured to provide data, the internal circuit data-out flip-flop 108 provides the data.

Significantly, the internal circuit 130 does not require an internal circuit enable flip-flop. The internal circuit 130 never drives the AGP bus extension 192, so the internal circuit 130 never has occasion to enable the output buffer 164. Therefore, there is no need for an enable flip-flop.

Advantageously, the computer system 144 of FIG. 5 includes a fourth internal signal path, for example a second portion of the bufferless data path 122, which provides a direct connection from the internal bus bridge data-out flip-flop 102 of the bus bridge 120 to the internal circuit data-in flip-flop 110 of the internal circuit 130. This connection provides a fourth internal signal from the bus bridge 120 and is extremely fast. Whenever the bus bridge 120 provides data over the AGP bus 190 (shown in FIG. 4), such data is received by the internal circuit 130 and captured in the internal circuit data-in flip-flop 110 for processing within the internal circuit 130. This high speed direct connection cannot be corrupted by any reflection signal propagating from the external circuit 150. There is no path, buffered or unbuffered, that would allow reflection signals from the external circuit 150 to corrupt bus bridge signals propagating along the bufferless data path from the bus bridge 120 to the internal circuit data-in flip-flop 110. Also, this direct connection does not require any enabling or storage.

The computer system 144 of FIG. 5 also includes the internal I/O circuit 118, implementing the internal I/O circuit 140 of FIG. 4. The internal I/O circuit 118 includes a pair of buffers. The output buffer 164 of the pair of buffers passes bus bridge signals from the internal bus bridge data-out flip-flop 102 via the AGP bus 190 (shown in FIG. 4) to the external circuit 150. The output buffer 164, therefore, operates in parallel with the bufferless data path 122 from the internal bus bridge 120 to the internal circuit 130. When the bus bridge 120 issues a bus bridge signal, the bus bridge signal therefore passes along two parallel paths: a first path to the internal circuit 130 and the second path to the external circuit 150.

The input buffer 166 of the internal I/O circuit 118 receives signals from the external circuit 150 and directs such signals away from the internal circuit 130. Accordingly, the internal I/O circuit 118 electrically isolates the internal circuit 130 from the external circuit 150. The input buffer 166 of the internal I/O circuit 118 directs the signals received from the external circuit 150 to the multiplexer 126. Signals from the internal circuit 130 are also provided to the multiplexer 126. The multiplexer 126 is controlled, in one embodiment, by a control bit of a register within the integrated bus bridge graphics unit 194.

In another embodiment, the mulitplexer 126 is controlled by circuitry that monitors transfers from the bus bridge 120 to the internal circuit 130 and the external circuit 150. If desired, the multiplexer 126 may be set by a mechanical switch, or an initialization circuit configuration. When the bus bridge 120 is addressing the external circuit 150, the circuit selection logic 185 causes the multiplexer 126 to select signals from the external circuit 150 via the input buffer 166 of the internal I/O circuit 118. When the bus bridge is targeting the internal circuit 130, the circuit selection logic 185 causes the multiplexer 126 to select signals from the internal circuit 130 directly via the internal circuit data-out flip-flop 108.

The output of the multiplexer 126 provides signals to the internal bus bridge data-in flip-flop 104 of the bus bridge 120. Accordingly, the bus bridge 120 is able to receive signals from only one of the internal circuit 130 and the external circuit 150, at any given time.

Accordingly, the computer system 144 isolates the internal circuit 130 from the external circuit 150. In this embodiment, although signals from the bus bridge 120 are provided to both the internal circuit 130 and the external circuit 150, internal circuit 130 cannot receive signals from the external circuit 150, and the external circuit 150 cannot receive signals from the internal circuit 130. Another embodiment allows communication between the internal circuit 130 and the external circuit 150, by including appropriate mulitplexers at the input to the internal circuit data-in flip-flop 110, and the input to a data input of the output buffer 164. By electrically isolating the internal circuit 130 from the external circuit 150, the computer system 144 protects the internal circuit 130 from reflection signals bouncing from the external circuit 150, by separating the bufferless data path 122 from the external circuit 150.

The external circuit 150 of FIG. 5 includes an external circuit data-out flip-flop 112 and an external circuit data-in flip-flop 114, as well as the external circuit enable flip-flop 116. The external circuit data-out flip-flop 112 is operably coupled to provide signals from a device located at the external circuit 150, or coupled to the computer system 144 via the external circuit 150. The external circuit data-out flip-flop 112 is operably coupled to align the first external signal to comply with timing requirements of the AGP bus protocol.

The external circuit data-in flip-flop 114 is operably coupled to receive signals from the AGP bus 190 for the external circuit 150, or for a device coupled to the computer system 144 via the external circuit 150. The external circuit data-in flip-flop 114 is operably coupled to capture signals (representing data or instructions), while the signals are valid, pending the external circuit 150 reading the data or instructions from the AGP bus 190.

The device provides a configurable bus interface such as an input/output buffer that couples an internal bus bridge, an internal circuit such as an on-chip graphics controller and an external circuit such as an expansion slot configured to receive an expansion or upgrade graphics controller. The device is appropriate for an integrated bus bridge and graphics controller.

It should be understood that the implementation of other variations and modifications of the invention in its various aspects will be apparent to those of ordinary skill in the art, and that the invention is not limited by the specific embodiments described. For example, in computer systems having an integrated PCI bus and AGP bus, the external circuit may be any PCI bus expansion slot, and the graphics controller may be any bus slave. It is therefore contemplated to cover by the present invention, any and all modifications, variations, or equivalents that fall within the spirit and scope of the basic underlying principles disclosed and claimed herein.

What is claimed is:

1. A configurable interface circuit comprising:
   a first internal circuit operable to provide a first internal signal via a first internal signal path;
   an input buffer operable to receive a first external signal via a first external signal path;
   a selector circuit coupled to the first internal circuit via the first internal signal path, and to the input buffer, the selector circuit operable to select either the first internal signal or the first external signal to provide a selected signal;
   an output buffer operative to receive a second internal signal via a second internal signal path and to provide the second internal signal via the first external signal path; and
   a second internal circuit operable to provide the second internal signal via the second internal signal path and to receive the selected signal via a third internal signal path, the selector circuit inoperable to receive the second internal signal.

2. The configurable interface circuit of claim 1, wherein:
   the first internal signal path and the first external signal path are operable to propagate signals in accordance with a common protocol.

3. The configurable interface circuit of claim 2, wherein: protocol is a PCI bus protocol.

4. The configurable interface circuit of claim 2, wherein: protocol is an AGP bus protocol.

5. The configurable interface circuit of claim 2, wherein: protocol is an NGP bus protocol.

6. The configurable interface circuit of claim 1, wherein: the second internal circuit is operable to provide the second internal signal via the second internal signal path to both the first internal circuit and the output buffer.

7. The configurable interface circuit of claim 1, wherein: the second internal circuit is operable to receive a selected signal that is either the first internal signal or the first external signal from the selector circuit, and inoperable to receive the second internal signal from the selector circuit.

8. The configurable interface circuit of claim 1, wherein: the second internal circuit is operable to provide the second internal signal to the first internal circuit via a fourth internal signal path when the second internal circuit is in a first mode, and to provide the second internal signal to the output buffer via the second internal signal path when the second internal circuit is in a second mode.

9. The configurable interface circuit of claim 1, wherein: the second internal circuit comprises a bus interface.

10. The configurable interface circuit of claim 9, wherein: the second internal circuit is a bus bridge.

11. The configurable interface circuit of claim 9, wherein: the first internal circuit is a graphics controller.

12. The configurable interface circuit of claim 1, wherein: the first internal circuit comprises a bus interface.

13. The configurable interface circuit of claim 1, wherein: the first internal circuit is operable to receive the second internal signal via the second internal signal path.

14. The configurable interface circuit of claim 1, further comprising:
a bus bridge, comprising a bus interface, operable to provide a second internal signal to the first internal circuit via a second internal signal path and to receive the selected signal via a third internal signal path.

15. The configurable interface circuit of claim 14, wherein:
the first internal signal path and the first external signal path are operable to propagate signals in accordance with a common protocol.

16. The configurable bus interface circuit of claim 1, wherein:
the selector circuit is operable to provide a selected signal that is uncorrupted by transmission line effects.

17. The configurable bus interface circuit of claim 1, wherein:
the input buffer is inoperable to provide the first external signal from the first external signal path to the first internal circuit.

18. The configurable bus interface circuit of claim 1, wherein:
the input buffer is inoperable to provide the first external signal from the first external signal path to the first internal circuit; and the output buffer is inoperable to provide the first external signal from the first external signal path to the first internal circuit.

19. A configurable interface circuit comprising:
an internal graphics controller operable to provide a first internal signal via a first internal signal path;
an input buffer operable to receive a first external signal via a first external signal path;
a selector circuit coupled to the internal graphics controller via the first internal signal path, and to the input buffer, the selector circuit operable to select either the first internal signal or the first external signal to provide a selected signal;
a bus bridge, comprising a bus interface, operable to provide a second internal signal to the internal graphics controller via a second internal signal path and to receive the selected signal via a third internal signal path; and
an output buffer operative to receive the second internal signal via the second internal signal path and to provide the second internal signal via the first external signal path such that the input buffer and the selector circuit are inoperable to receive the second internal signal.

20. A configurable bus interface circuit comprising:
a first internal circuit operable to provide a first internal signal via a first internal signal path;
an input buffer, operatively coupled to a first external signal path, and to the first internal circuit via the first internal signal path, and operative to receive the first internal signal from the first internal signal path and to provide the first external signal on the first external signal path;
a selector circuit, operatively coupled to the first internal circuit via the first internal signal path, and to the input buffer, and operative to cause the input buffer to provide the first internal signal from the first internal signal path to the first external signal path, and to isolate the first internal signal on the first internal signal path from the first external signal;
an output buffer operative to receive a second internal signal via a second internal signal path and to provide the second internal signal via the first external signal path; and
a second internal circuit operable to provide the second internal signal via the second internal signal path and to receive the selected signal via a third internal signal path, the selector circuit inoperable to receive the second internal signal.

21. The configurable bus interface circuit of claim 20 including:
a first external circuit, operatively coupled to the input buffer via the first external signal path to receive the first external signal, such that the input buffer is operative to provide the first internal signal from the first internal signal path to the first external signal path, and to prevent the first internal signal on the first internal signal path from propagating to the first external signal path.

* * * * *